(12) United States Patent
Hesse

(10) Patent No.: US 6,491,476 B2
(45) Date of Patent: Dec. 10, 2002

(54) METHOD AND APPARATUS FOR THE TRENCHLESS LAYING OF PIPEWORK UNDERGROUND

(75) Inventor: Alfons Hesse, Lennestadt (DE)

(73) Assignee: Tracto-Technik Paul Schmidt Spezialmaschinen, Lennestadt (DE)

(*) Notice: Subject to any disclaimer, the term of this patent is extended or adjusted under 35 U.S.C. 154(b) by 0 days.

(21) Appl. No.: 09/295,650

(22) Filed: Apr. 21, 1999

(65) Prior Publication Data

US 2002/0110425 A1 Aug. 15, 2002

(30) Foreign Application Priority Data

Apr. 22, 1998 (DE) .......................................... 198 17 873

(51) Int. Cl.[7] ................................................. F16L 1/00
(52) U.S. Cl. ................................ 405/184.2; 405/184.3; 405/184
(58) Field of Search ................................ 405/184, 154, 405/146, 150.1, 156, 174; 156/294, 287; 264/516, 506, 508, 209.5, 269, 280, 291, 292; 254/29 R; 425/71, 86, 393, 445, 387.1, 392

(56) References Cited

U.S. PATENT DOCUMENTS

| | | | | |
|---|---|---|---|---|
| 3,631,933 A | * | 1/1972 | Bryant | ........................ 405/156 |
| 3,876,351 A | * | 4/1975 | Takada | ........................ 425/62 |
| 4,386,628 A | * | 6/1983 | Stanley | ........................ 138/97 |
| 4,637,756 A | * | 1/1987 | Boles | ........................ 405/184 |
| 5,173,009 A | * | 12/1992 | Moriarty | ........................ 405/154 |
| 5,346,658 A | * | 9/1994 | Gargiulo | ........................ 156/287 X |
| 5,709,503 A | * | 1/1998 | Manlow | ........................ 405/154 |
| 5,980,157 A | * | 11/1999 | Puttman | ........................ 405/184 |

FOREIGN PATENT DOCUMENTS

| | | |
|---|---|---|
| DE | 196 08 980 | 9/1997 |
| DE | 197 14 705 | 10/1998 |

OTHER PUBLICATIONS

Dec. 1989, "Steinzeug–Losungen im Rohrleitungsbau", TIS and Abstract.

1998, Erkennen–Vermeiden, *Fehler in Der Kanalsanierug*, Vulkan–Verlag Essen, pp. 49, 55–56, 104–125 and Abstract.

* cited by examiner

Primary Examiner—Heather Shackelford
Assistant Examiner—Sunil Singh
(74) Attorney, Agent, or Firm—Merchant & Gould P.C.

(57) ABSTRACT

Apparatus and method for the trenchless laying of pipework underground, having a total and a gauge for the continuous widening of a preferably wound preformed pipe on a linkage for use in pits of small dimensions, preferably inspection shafts of sewage systems.

17 Claims, 7 Drawing Sheets

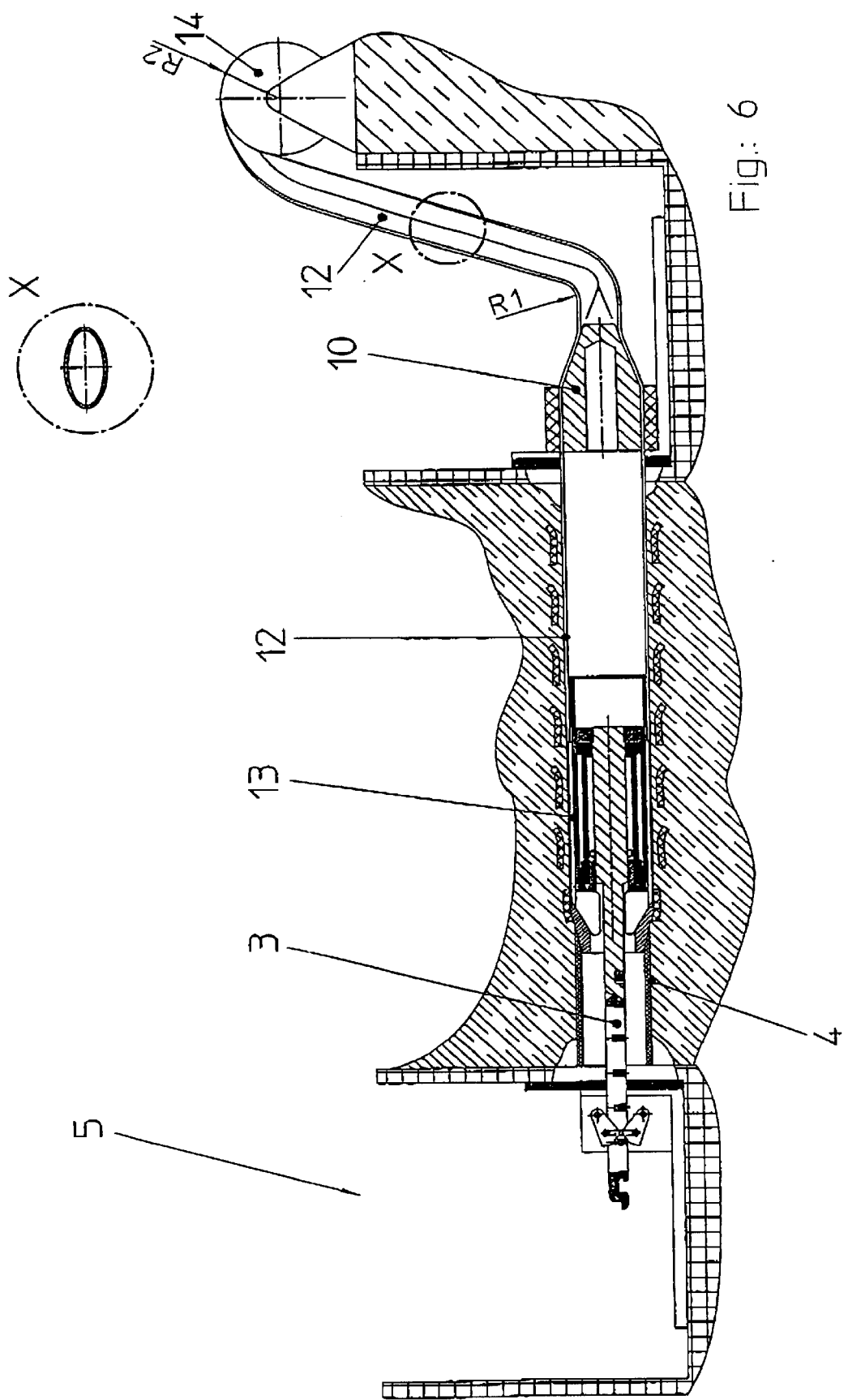
Fig.: 6

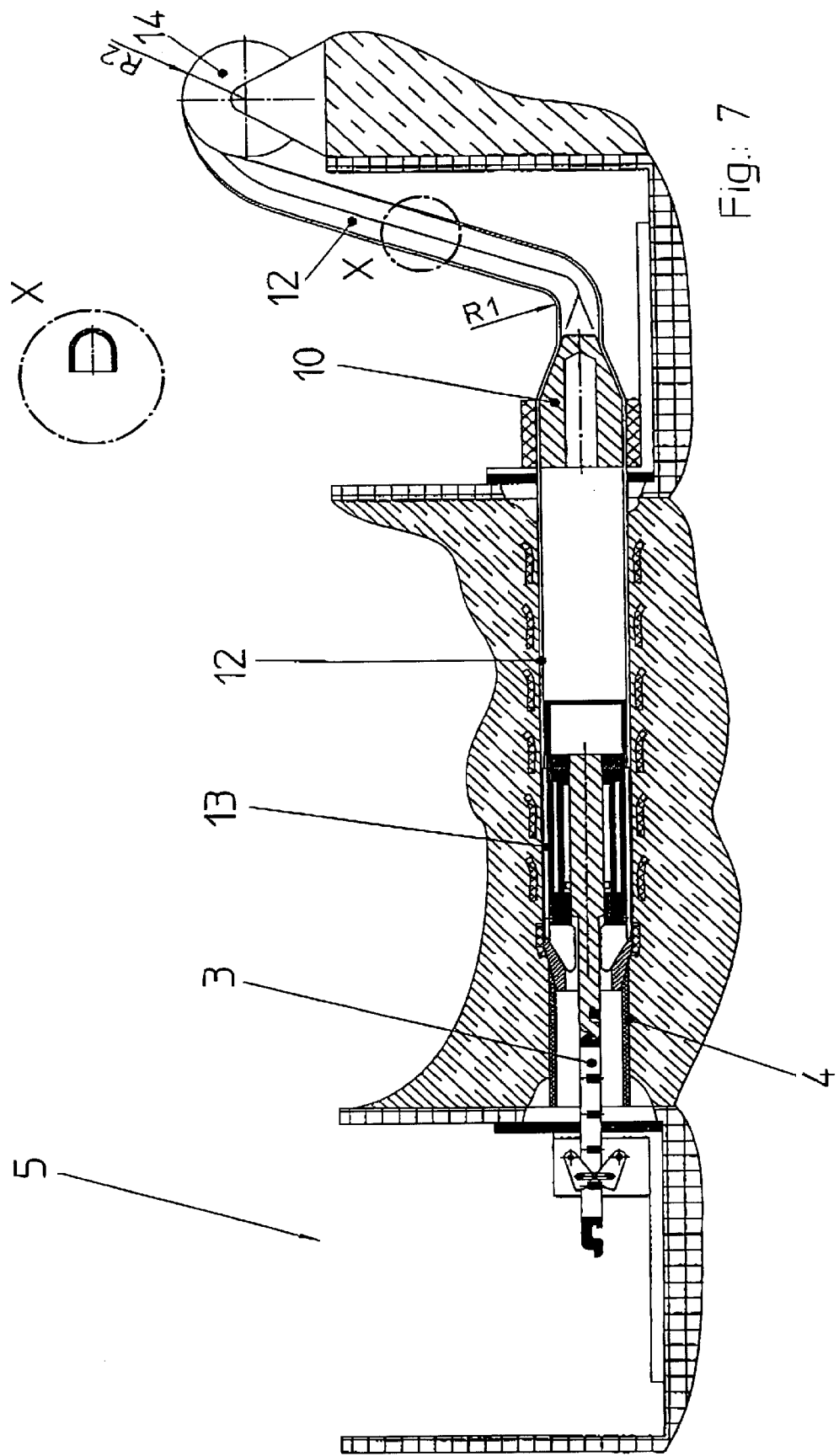

METHOD AND APPARATUS FOR THE TRENCHLESS LAYING OF PIPEWORK UNDERGROUND

FIELD

The invention relates to an apparatus and a method for the trenchless laying of pipework underground.

BACKGROUND

The primary purpose of such apparatuses and/or methods is the laying of line systems, such as drains, for example under roads or pavements without at the same time having to dig up the road surface or pavement. As a drilling, bursting or widening apparatus moves through the earth, it forces the earth aside or removes it and leaves behind an underground. channel into which a supply line can then be drawn as a follow-up pipe.

A drilling. apparatus of this type is known from Genaan Published Application 196 08 980. It comprises a platform with a hydraulic piston/cylinder unit which reciprocally moves a traveler in a linear manner. The traveler is connected to a locking pawl which, during the advance of the traveler, engages behind a rung of a ladder-type linkage and so moves the linkage, connected to the drilling head, forward in the drilling direction in accordance with the stroke of the hydraulic piston/cylinder unit At the end of to stroke, the locking pawl is automatically released from the rung and the traveler moves back automatically into its initial position, in which the locking pawl again engages behind a rung. The disposal or supply line which is to be laid is secured to the drilling head.

The line, in this method, is screwed or plugged together, for example, from individual pipe sections which are drawn in during the forward advance. In particular, the screwing of the pipe sections entails an additional working effort and causes problems because the screw connection can easily be contaminated and because the screw connection always results in a surface irregularity at the point of the butt joint In plug-in Systems the pipe sections, if their connections are not resistant to traction, have to be drawn into the tube made in the earth via a traction means, and have first to be threaded onto the traction means. The pipe sections that are drawn in have to be shorter than the length of the launch pit or the launch shaft In many cases drainage shaft have a diameter of only 1 m. In practice, only pipe sections 0.7 m in length can be drawn in from such constricted shaft, in other words the newly laid pipe has a socket joint every 0.7 m which may develop leaks. This pipe joint is always a weak point, since its wall thickness may not be greater than that of the actual pipe.

In order to avoid this disadvantage, PE pipes wound into coils are used. A disadvantageous effect of these pipes is that they are relatively rigid and have only a limited bending radius. The consequence of this is that the volume of the coil is very great and the pipes snap back powerfully—which is associated with a high risk of injury to the workers—and that the launch pit from which the drilling begins must have a certain size so that the PE pipe can be unwound from the roll situated at ground level and drawn into the microtunnel without being bent bow the admissible bending radius, causing damage to the pipe.

Especially in the laying of disposal or supply lines in cities, the dense building development means that it is often impossible to excavate sufficiently large pits for coiled pipes to be able to be used as follow-up pipes.

In addition, it is desirable for cost reasons to use as launch pits existing manholes which generally have an internal diameter of 1 m and an aperture having a diameter of about 80 cm.

In order to avoid these disadvantages what are known as folded pipes have been developed (cf. Series of publications from the Institute for Pipework Engineering at Oldenburg Technical University, Volume 14 "Fehler in der Kanalsanierung [Errors in sewer renovation]", Vulkan-Verlag, Essen, 1998). These pipes are notable for the fact that their diameter is reduced by their being folded to the cross section of a "U" or "C". As a result, these pipes are much more flexible than conventional circular pipes and so easier to handle. In the laying of these pipes, a folded pipe is initially drawn into an old line. In a second step it is brought into its final shape with the use of hot media subjected to the action of pressure.

This method, however. is suitable only for the laying of new pipes in existing ones which are not destroyed in the process. This means that the pipes are merely made good but not replaced, since the old line remains in place and is merely lined with an expansible or expanded pipe. It is, therefore, always necessary to accept a reduced diameter by comparison with the old line. In addition, much energy is needed to provide the hot media subjected to the action of pressure, which makes the method expensive. Furthermore, the control of the widening process is very laborious if it is desired to avoid damage to the new pipe.

SUMMARY

In the light of this background the object of the invention is to provide an apparatus and a method for the trenchless laying of pipework which can be implemented from pits of small dimensions, preferably existing inspection shafts of sewage system , and perferably permits the use of a compactly wound coiled or follow-up pipe.

The achievement of this object is based on the idea of using an easily transported and handled preformed material, especially a performed pipe of small cross section, which is given its final, preferably circular cross section only on site, for example in a narrow launch pit.

On this basis, the use is proposed of a preformed pipe of reduced cross section which, before being drawn into the ground, is continuously brought into shape by means of a gauge. Bringing into shape means that the pipe is brought to the intended final cross section on site or before entry into the ground, and is not shaped in its entirely after it has been laid. Such a preformed pipe offers the advantage of much smaller possible bending radii than a pipe of circular cross section. A PE pipe of U-shaped cross section is preferably used. Whereas a PE pipe of 200 mm diameter can be bent only to a radius of 6 m (equal to 30×d), a preformed pipe of the same diameter in the widened state having a U-shaped cross section can be bent to a radius of 0.9 m, in other words 6.1 m less, without sustaining damage.

The gauge which widens the PE pipe, folded for example in a U-shape to a smaller cross section, to a circular cross section before its entry into the ground is located in a stationary manner in the launch pit and is so designed that it can absorb the axial tension forms acting on the preformed pipe.

Instead of a U-shaped preformed pipe, it is also possible to use an elliptical preformed pipe in the form of a coil. It is also conceivable to use a pipe of smaller diameter which is stretched to a larger diameter in the launch pit The gauge may be heatable. It is however also conceivable to place the gauge, together with the preformed pipe section located immediately in front of it, in a bath filled with a temperature-controlled fluid, or to lay a heating collar around the gauge together with the pipe section, so that the pipe passes through between the gauge and the heating collar. The warming of the pipe permits non-destructive and low-energy widening to the final diameter.

The invention makes it possible to lay, instead of old lines, lines whose diameter is greater than that of the old line.

A cooling system may also be used to cool the previously warmed and shaped and/or widened pipe run and so bring it back to its original strength if the new pipe, after entry into the ground, is exposed to the full pressure of the ground and it is desired to prevent the shards of the old burst pipe from failing down.

In addition, the gauge can also be provided with lubricant nozzles In order to reduce the friction between gauge and PE pipe, using a conventional lubricant Similarly, the annulus space between the PE pipe and the ground can be filled with a lubricant and/or filler which simultaneously acts as a coolant Guide points may also be arranged in the area of entry of the pipe into the ground so that the pipe is bent to a preselected radius in that area. Such guide points are described in German Application 197 14 7054. As a result of this enforced guidance, which preferably consists of rollers, the pipe can be fed non-destructively in such a way that it extends in a space-saving manner in the launch shaft, so that shaft size can be further minimized.

The invention can be used both for introducing a new disposal or supply line into an existing line and for the laying of a new line instead of an old pipe which is demolished by means of a bursting head during laying and whose shards are displaced laterally or removed, and also in the laying of new lines.

BRIEF DESCRIPTION OF THE DRAWINGS

The invention is explained in detail below with reference to a plurality of examples of embodiments shown in the drawings. In the drawings:

FIG. 5 shows the cross section of a bore with launch and arrival pits and a floatingly mounted gauge and FIG. 6 shows an embodiment of the claimed invention extending from launch pit to arrival pit, with folded pipe having an elliptical cross-section;

FIG. 7 shows an embodiment of the claimed invention extending from launch pit to arrival pit, with folded pipe having a u-shaped cross-section.

DETAILED DESCRIPTION

Figure 1:
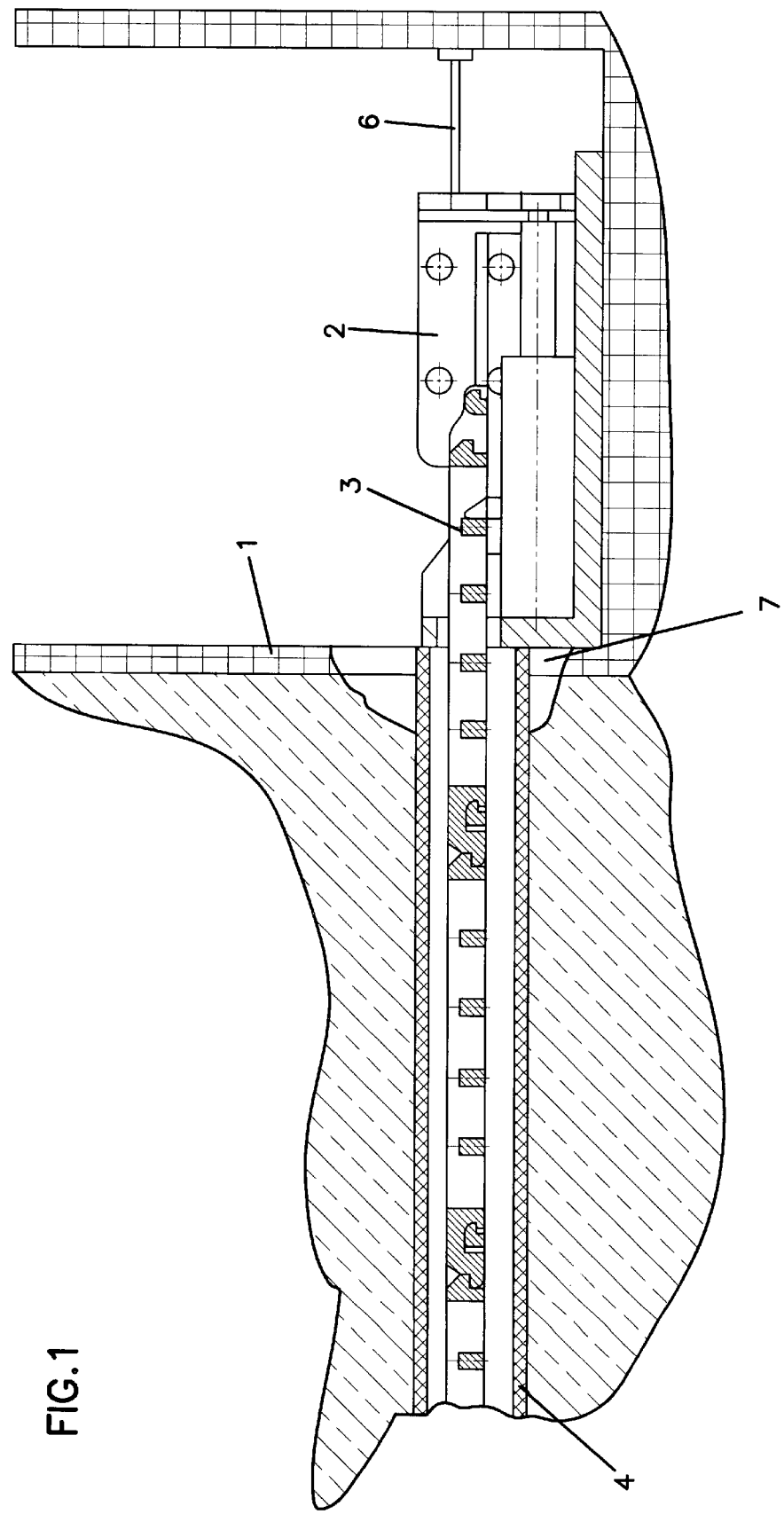
FIG. 1 shows the cross section of a launch pit with a thrust platform.
Figure 2:
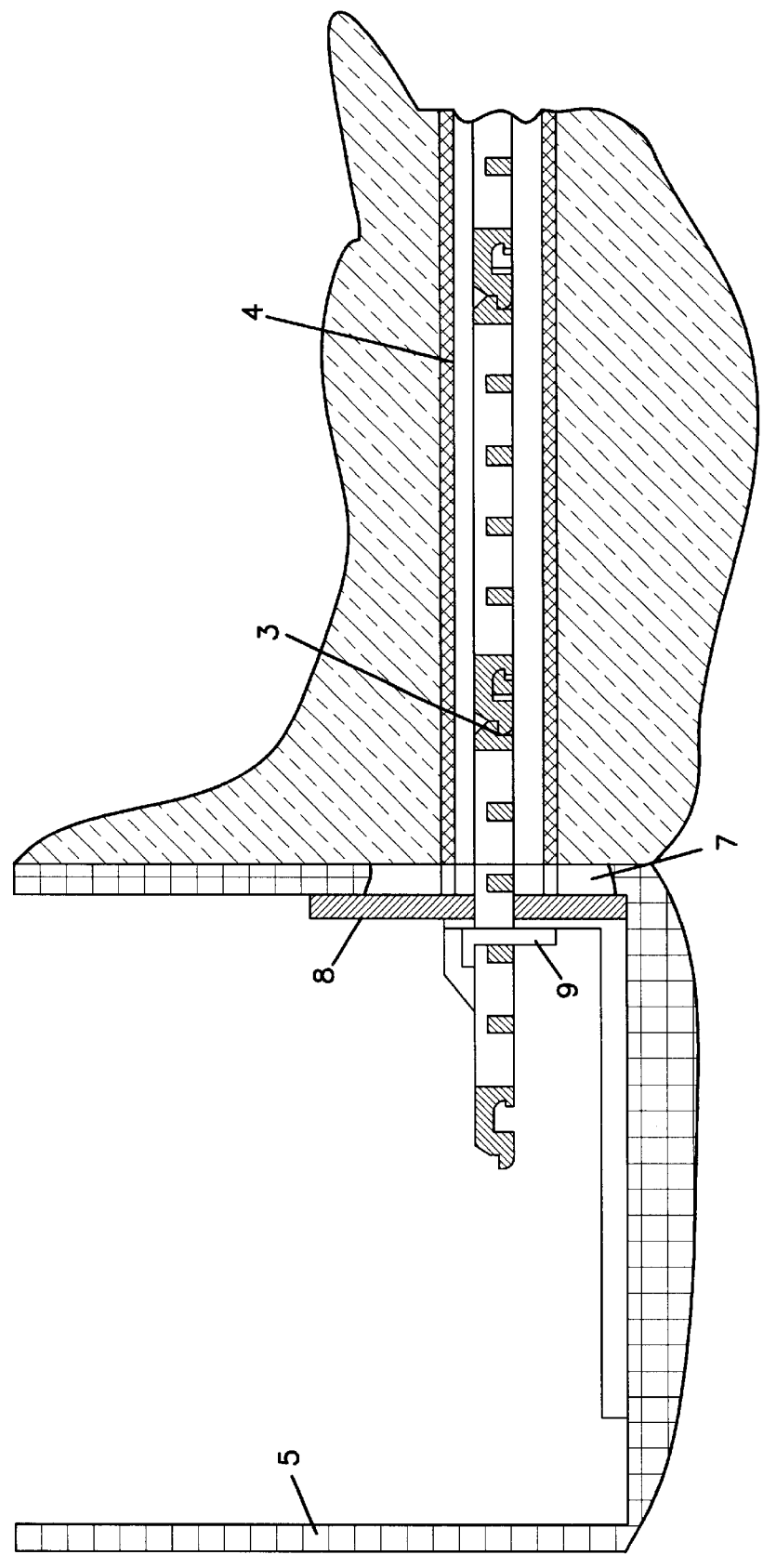
FIG. 2 shows the cross section of an arrival pit with a locking system for a linkage.

Starting from a drainage shaft or manhole 1, a ladders linkage 3 is introduced wise into an old line 4 by means of a thrust platform 2 until the linkage 3 reaches the arrival shaft 5 (cf. FIGS. 1 and 2). The size of the thrust platform 2 is preferably such that It fits into an existing drainage shaft with an internal diameter of 1 m. The same applies to the individual linkages which are connected to each other via plug connections to form the linkage run 3. The individual linkages preferably have a coupling head at one of their ends which is provided with a recess and lugs, while at the other end there is a transverse aperature which is limited by transverse wails so that the coupling head can be pivoted in through this transverse aperature for coupling to a further individual linkage. The lugs engage into corresponding cut-outs, So that a connection is formed which is rigid when pushed.

The thrust platform 2 is supported via a bar 6 on the side of the launch pit 1 opposite the old line. It may be necessary to dig out the area 7 of the launch shaft 1 and of the arrival shaft 5. This is particularly the case if work is taking place from an existing inspection shaft since the concreted shaft wall in the immediate vicinity of the old pipe then has to be dug out, because an old pipe cannot be fragmented and displaced outward in this wall. If new pipes with a larger diameter than that of the old pipe are laid, the area dug out must be even larger.

In the arrival shaft 5, the linkage 3 is fixed to an abutment plate 8 against axial movement toward the launch shaft 1 by means of a plug-type locking system 9. The plug-type locking system 9 of L-shaped cross section, engages through one of the apertures between the rungs of the ladder-type linkage 3.

Figure 3:
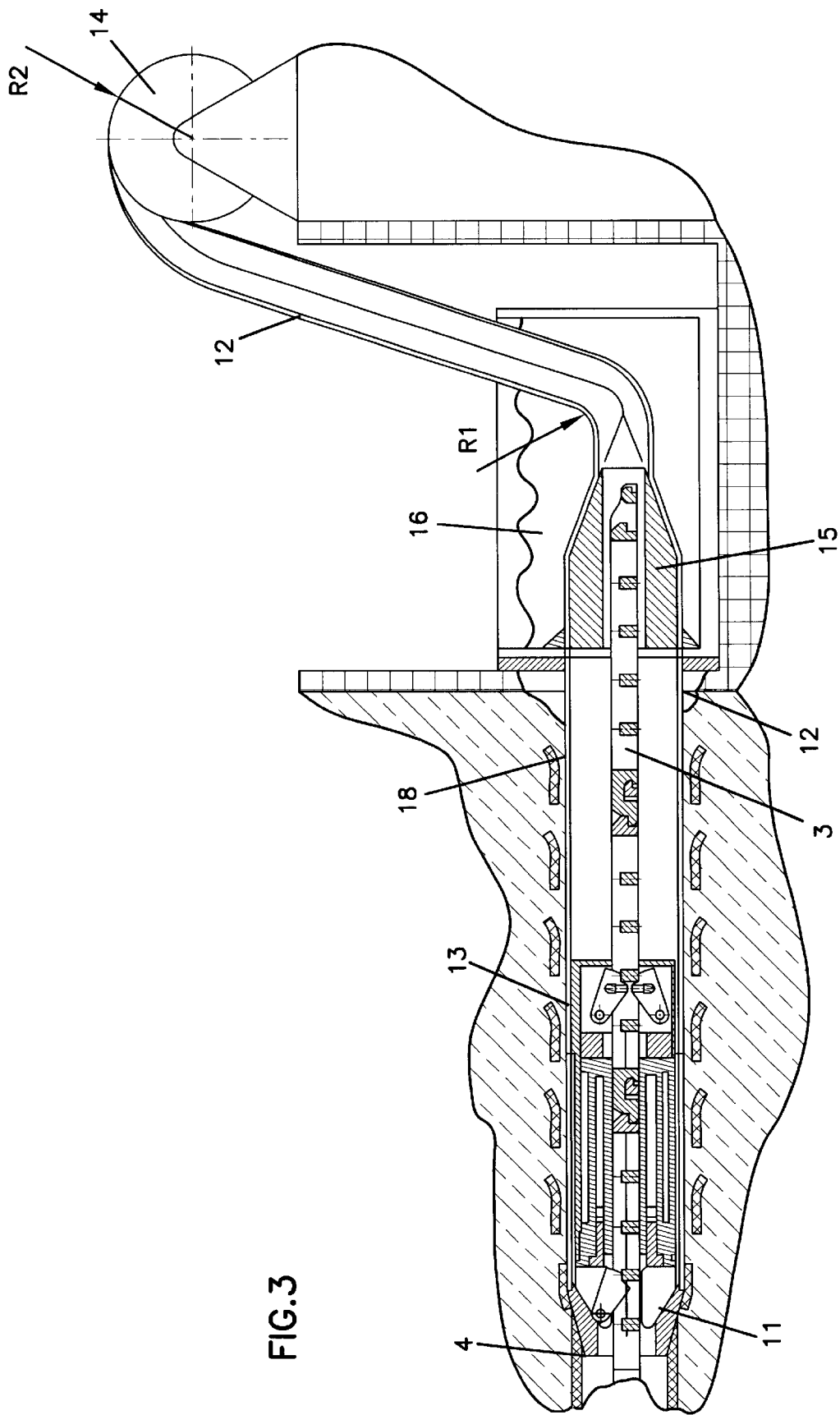
FIG. 3 shows the cross section of a launch pit with a gauge.

FIG. 3 shows a bursting and widening member 11 running along on the linkage 3, having a PE pipe 12 secured to its cradling end, for example by means of a connecting piece 13, which, during the bursting and/or widening operation, is drawn into the underground channel created by the bursting and widening member. A preformed PE pipe of reduced cross section is used as a follow-up pipe 12, preferably having a cross section folded together in a U- shape, whose bending radius R1 is much less than the of PE pipes of circular cross section, so that the laying of supply lines is also possible from existing manholes having a diameter of 1 m. The preformed pipe 12, which is unwound from a roller 14, runs, before it enters the ground, over a gauge 16 which continuously widens the U-shaped preformed pipe 12 to its final circular cross section.

The use of a folded pipe additionally off the advantage that, as a result of the increased flexibility, the winding capability is substantially increased, so that the winding radius R2 and hence the transportation bulk can be reduced, which is associated with cost savings. The snap-back is also reduced, so that accidents at work can be avoided.

The gauge 15 is fixed stationary on the linkage 3 in order to resist the axial stress and is located in the launch shaft 1.

In order to widen the preformed pipe 12 non-destructively it may have to warmed, for example by means of a temperature-controlled bath 16.

Figure 4:
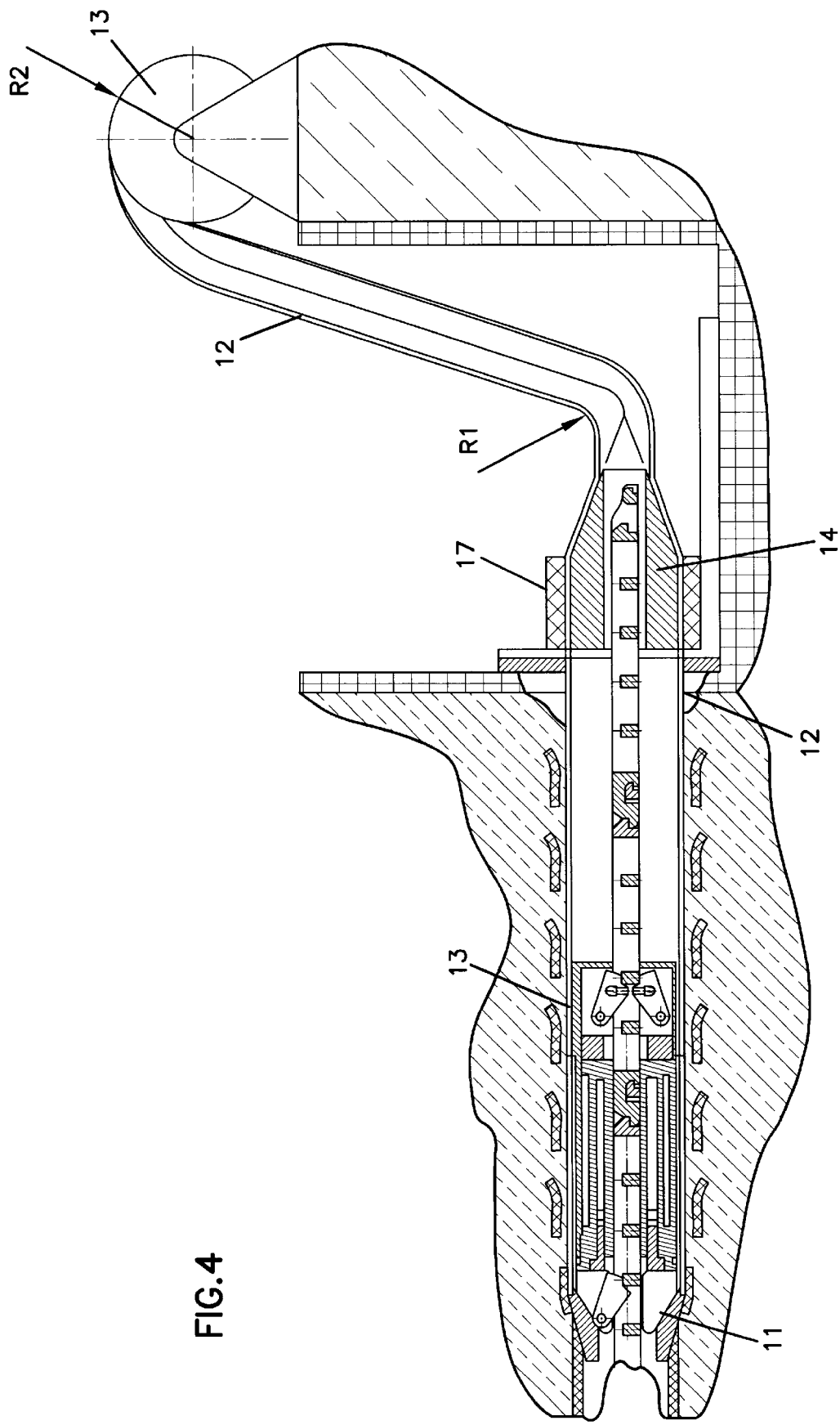
FIG. 4 shows a launch pit with another gauge.

Apart from a temperature/controlled fluid bath 16, the use of a heating collar 17, shown in FIG. 4, or of an internally heated gauge 15 is possible. The heating collar 17 surrounds the gauge 15 in a manner such that the preformed pipe 12 is passed between collar 17 and gauge 15 and thereby simultaneously warmed and widened. In order for the preformed or follow-up pipe 12 to have the necessary stability in the microtunnel to withstand the pressure of the shards of the old pipe and the displaced earth, it may be necessary to arrange a cooling system 18 behind the gauge 15 in the direction of advance with the aid of which the PE pipe is cooled and thus strengthened again (cf. FIG. 3).

Figure 5:
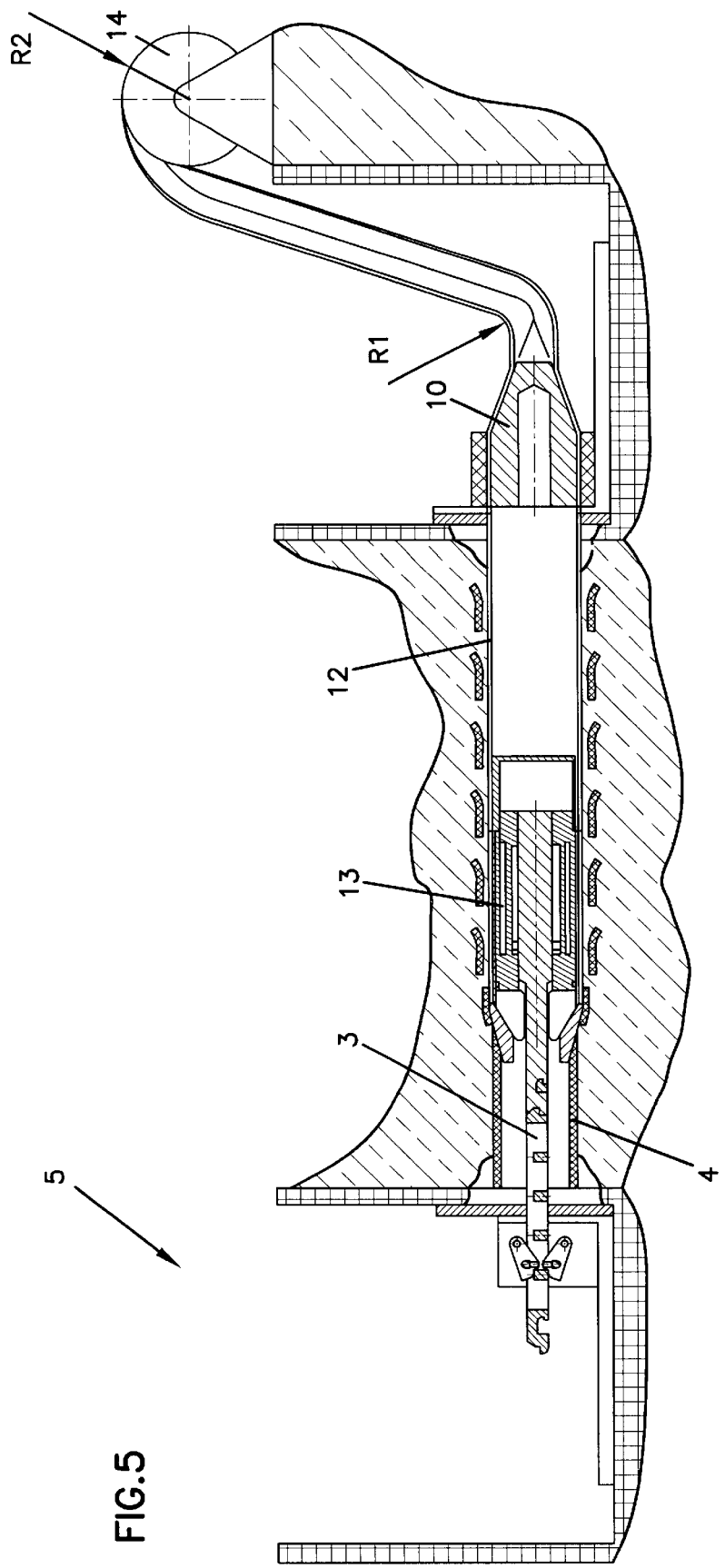

FIG. 5 shows an apparatus in which the linkage 3 does not remain in the new pipe 12 but is pushed with it the arrival pit 5. The gauge 15 is, in this case, floatingly mounted in the now pipe 12, support optionally being provided by a fluid situated between the bursting and/or widening member 11 and the gauge 15.

What is claimed is:

1. An apparatus for the trenchless laying of preformed pipe underground, comprising:

a tool for drawing the preformed pipe into the ground;

a linkage fixedly held at one end thereof; and a stationary gauge for widening the preformed pipe before the preformed pipe is drawn into the ground; wherein the tool moves itself along the linkage.

2. The apparatus as claimed in claim 1, wherein the tool is designed as a widening head.

3. The apparatus as claimed in claim 1, wherein the preformed pipe has a U-shaped cross-section.

4. The apparatus as claimed in claim 1, wherein the preformed pipe has an elliptical cross-section.

5. The apparatus as claimed in claim 1, wherein the preformed pipe has axial folds.

6. The apparatus as claimed in claim 1, wherein a diameter of the preformed pipe is smaller than a diameter of the gauge.

7. The apparatus as claimed in claim 1, wherein the gauge is connected to the linkage.

8. The apparatus as claimed in claim 1, wherein the gauge is located in a launch pit.

9. The apparatus as claimed in claim 1, wherein the gauge is heatable.

10. The apparatus as claimed in claim 1, comprising a heating collar surrounding the gauge.

11. The apparatus as claimed in claim 1, wherein the gauge is located in a temperature-controlled bath.

12. The apparatus as claimed in claim 1, comprising a cooling system in front of the gauge in the direction of advance.

13. The apparatus as claimed in claim 1, wherein the preformed pipe is PE pipe.

14. The apparatus as claimed in claim 1, wherein the preformed pipe is folded preformed pipe.

15. A method for the trenchless laying of pipework underground, comprising the steps of:

pushing a linkage from a launch shaft to an arrival shaft;

fixing the linkage at a first end thereof;

providing a widening gauge at a second end of the linkage;

drawing a preformed pipe into the ground with a tool; and widening the preformed pipe continuously with the widening gauge before it enters the ground.

16. The method as claimed in claim 15, wherein the preformed pipe is folded preformed pipe.

17. The method as claimed in claim 15, wherein the tool is a widening head.

\* \* \* \* \*